Figure 1:
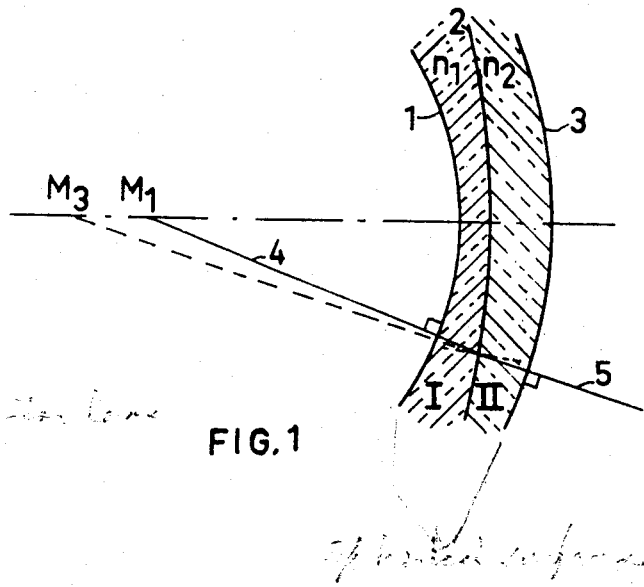

Aug. 23, 1960

J. BECKER ET AL 2,949,820

OPTICAL SYSTEMS

Filed Dec. 26, 1956

2 Sheets-Sheet 1

INVENTORS
J. Becker
B. S. Blaisse
BY
Wenderoth, Lind & Ponack
ATT'S

Aug. 23, 1960 J. BECKER ET AL 2,949,820
OPTICAL SYSTEMS
Filed Dec. 26, 1956 2 Sheets-Sheet 2

INVENTORS
J. Becker
BY B. S. Blaisse
Wenderoth, Lind & Ponack
Attys

United States Patent Office 2,949,820
Patented Aug. 23, 1960

2,949,820

OPTICAL SYSTEMS

Johannes Becker, Park Leeuwenbergh, Voorburg, and Berndt Stephan Blaisse, Delft, Netherlands, assignors to N.V. Optische Industrie "De Oude Delft," Delft, Netherlands Filed Dec. 26, 1956, Ser. No. 630,595

Claims priority, application Netherlands Jan. 6, 1956

5 Claims. (Cl. 88—57)

The invention relates to an optical system corrected for spherical aberration, comprising a concave spherical mirror and a meniscus-shaped correcting lens (herein after referred to as "meniscus lens") with spherical external surfaces whose centers of curvature are situated near the center of curvature of the mirror. Optical systems of this kind, which are commonly referred to in the art as "concentric systems," have been disclosed in various patent specifications, e.g. in the U.S. patent specification 2,492,461.

Optical systems of this kind are practically free from coma and astigmatism and are, in fact, entirely free from these aberrations in case the systems are purely concentric, i.e. if the centers of curvature of the mirror and those of the surfaces of the meniscus are concident. They may be corrected for spherical aberration of up to and including the third order, as the spherical aberration of the correcting element and mirror are of opposite kind. They have a large serviceable field of view and a high luminosity. A disadvantage of these systems, however lies in the fact that with very high luminosities the meniscus lens must have a comparatively high negative power (e.g., for $f/0.9$, approximately 8% of the total power of the system) in order that it may sufficiently offset the spherical aberration of the mirror. This high negative power of the lens results in a diameter of the mirror which is considerably greater than that of the lens. This drawback becomes increasingly serious the greater the focal length and the aperture of the system is, and this is precisely one of the principal fields of application of mirror systems of this kind, as lens systems of large diameter are too heavy, too intricate and too expensive, in addition to which they show pronounced absorption of light energy.

Other mirror systems already disclosed consist of a concave spherical mirror and one or more correcting elements which are positioned at or near the center of curvature of the mirror. Systems designed in this way, unlike concentric systems, offer the advantage that it is possible to avoid enlargement of the diameter of the mirror by constructing the correcting lens in such a manner that its strength is nil.

A well-known example of this is the Schmidt system, in which the correcting element is shaped as a plate having at least one aspherical surface. These systems, however, present the drawback that the correcting element introduces higher order astigmatism. Besides, it is difficult to make the aspherical surface with the requisite degree of precision, which, particularly in mass production, has proved to be an almost insuperable obstacle. The object of the invention is to provide a solution by means of which it is possible to retain the advantage of the concentric system, viz., absence of coma and astigmatism and to minimize the power of the correcting lens which serves to offset the spherical aberration of the mirror, so that on the one hand the diameter of the mirror need not be enlarged, whilst on the other hand a large serviceable field is nevertheless obtained.

This result has been achieved in the optical system according to the invention by forming the meniscus lens from two components, one of positive and one of negative power, the component having positive power being made of a material having an index of refraction which, for the middle wave-length of the light used, is at least 0.05 higher than the index of refraction of the component having a negative power, the radii of curvature of the external surfaces and of the internal surface between the two components being such that the internal surface is traversed approximately perpendicularly by light rays emanating from the point of the object which is situated on the optical axis, while an image of the center of curvature of one external surface of the meniscus lens is formed by the internal surface at a position situated at or near the center of curvature of the other external surface. Furthermore, the concave mirror is preferably placed at such a position with respect to the meniscus lens that its center of curvature coincides with that of said last-mentioned external surface. The system formed in this way may be described as pseudo-concentric, as it possesses in common with a purely concentric system the feature that a light-ray passing through the center of curvature of one of its surfaces impinges perpendicularly not only upon that surface but also upon the other of the two surfaces (see Fig. 1).

In this way it is possible to arrange the two components of the meniscus lens in such a way that this lens has a power which is very small if compared to that of the lenses used heretofore, and a spherical aberration which is practically of the same value as that of the mirror but in opposite sense to the latter.

The calculation of the system according to the invention has shown that the aforementioned difference of 0.05 between the index of refraction of the positive and that of the negative component of the meniscus lens may be considered to be a practical minimum.

If the concave surface of the meniscus lens is facing the mirror and a diaphragm is placed at the common center of curvature of the concave mirror and one of the external surfaces of the meniscus lens whose internal surface as defined above allows the light-rays from the center of the object to pass through it without refraction after they have been refracted by the first external surface, the system is exactly free from coma. The same holds if the meniscus lens is situated between the concave mirror and the center of curvature of the latter, thus facing the mirror with its convex external surface, and the diaphragm is placed in the center of curvature of the front surface of the meniscus lens.

Moreover, in this arrangement no astigmatism is introduced either by the concave mirror or by the external surfaces of the meniscus lens. This does occur with the internal surface, but the degree of astigmatism introduced by this surface is an order of magnitude lower than the astigmatism introduced by a Schmidt plate.

Figure 2:
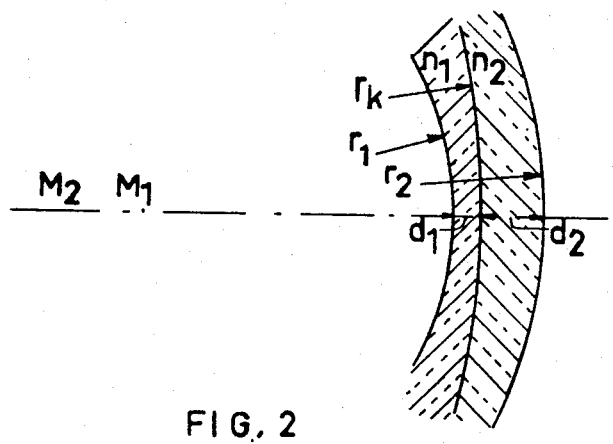

By giving the radius of curvature $r_k$ of the internal surface such a value that the light-rays emanating from the center of the object pass perpendicularly through this surface, the following relation is obtained for the radius $r_k$ when the distance of the object is infinite in the arrangement of Fig. 2:

$$r_k = \frac{r_1 n_1}{n_1 - 1} + d_1$$

where:

$r_1$ = radius of the concave meniscus lens surface
$d_1$ = thickness of the meniscus lens component facing the center of curvature.

For $r_1 = 1$ the strength of the entire correcting element is nil if the external radius $r_2$ of the second component of the correcting element is:

$$r_2 = \frac{(n_2 - 1)}{n_2}(d_1 + d_2) + \frac{n_2 - 1}{n_1 - 1} \cdot \frac{n_1}{n_2}$$

where:

$r_2$ = radius of the convex meniscus lens surface
$d_2$ = thickness of the meniscus lens component facing away from the center of curvature
$n_2$ = index of refraction of the meniscus lens component facing away from the center of curvature The condition of being pseudo-concentric is fulfilled when:

$$r_2 = d_2 + \frac{n_2\{n_1 + d_1(n_1 - 1)\}(d_1 + 1)}{n_2\{n_1 + d_1(n_1 - 1)\} - (n_2 - n_1)}$$

In certain circumstances it may be desirable for constructive reasons to depart somewhat from the pseudo-concentric arrangement described above. In order that the system may in that case be sufficiently free from coma and astigmatism, the distance from the centers of curvature of the meniscus lens to the center of curvature of the mirror should preferably be made smaller than one tenth part of the radius of curvature of the mirror. The accompanying drawings may serve to illustrate the invention.

Fig. 1 shows the path of a light ray through a pseudo-concentric meniscus lens in an optical system according to the invention. The various quantities used in the above-mentioned formulae are indicated in Fig. 2.

Figure 3:
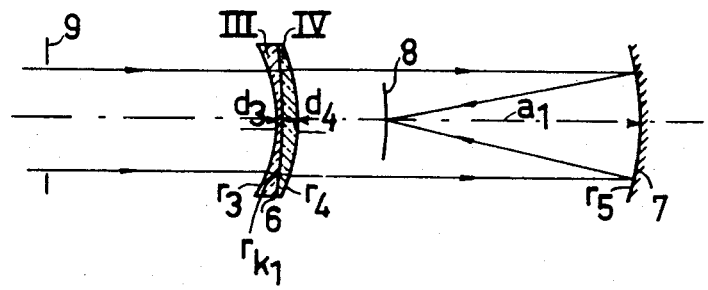

Fig. 3 gives an embodiment of the of the optical system according to the invention in which the meniscus lens is curved in the same sense as the mirror.

Figure 4:
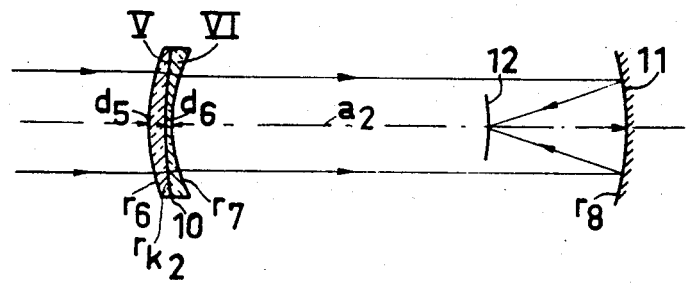

Fig. 4 gives a diagram of an embodiment in which the correcting element is curved in opposite sense to the mirror.

Figure 5:
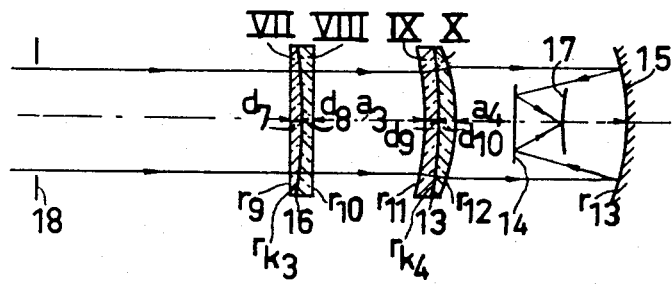

Lastly, Fig. 5 gives an embodiment according to Fig. 3 with the addition of a color correction plate.

In Fig. 1, 1 and 3 represent the external surfaces of a pseudo-concentric meniscus-shaped correcting element according to the invention, 2 the internal surface between the two components I and II of the element. A light-ray 4 passing through the center of curvature $M_1$ of surface 1 traverses this surface without refraction. At the internal surface 2 the light-ray is refracted in such a way that the refracted ray 5 impinges perpendicularly upon the external surface 3 and hence traverses this surface without being refracted. This light-ray is therefore directed towards the center of curvature $M_3$ of this external surface.

Some examples of the optical system according to the invention will be given below.

In the following tables given in the examples the lens components are indicated at I to X, $r_1$ to $r_{10}$, $r_{k1}$ to $r_{k3}$ are the radii of curvature of the respective refracting surfaces, $d_1$ to $d_{10}$ are the axial thicknesses and separations between the refracting surfaces, $a_1$ to $a_4$ are air spaces between the lens elements, $n_D$ is the refractive index, and "V" is the dispersion ratio or Abbe number of the lens materials.

*Example I*

The optical system according to Fig. 3 consists of the correcting element 6 and the concave spherical mirror 7. The image surface is indicated as 8, the diaphragm as 9.

The various dimensions of the system are set forth in the following table.

[$f$ = 100 mm.; 1:1.25]

| Component | Radius of curvature, mm. | Thickness, mm. | Distance, mm. | $n_D$ | $\nu$ | Grade of glass |
|---|---|---|---|---|---|---|
| III | $r_3 = -66.54$ | $d_3 = 2.7$ | | 1.5407 | 47.2 | LLF$_1$ |
| IV | $r_{k1} = -192.26$ | $d_4 = 7.2$ | | 1.6700 | 47.3 | BaF$_{10}$ |
| | $r_4 = -80.03$ | | | | | |
| Mirror | $r_5 = -210.42$ | | $a_1 = 130.4$ | | | |

*Example 2*

Fig. 2 shows an optical system in which the correcting element 10 is curved in a sense opposite to that of the mirror 11. In this figure the image surface is indicated as 12. The dimensions are as follows:

[$f$ = 100 mm.; 1:1.4]

| Component | Radius of curvature, mm. | Thickness, mm. | Distance, mm. | $n_D$ |
|---|---|---|---|---|
| V | $r_6 = 63.14$ | $d_5 = 5.83$ | | 1.52 |
| VI | $r_{k2} = 186.47$ | $d_6 = 1.9$ | | 1.62 |
| | $r_7 = 73.60$ | | | |
| Mirror | $r_8 = -190.7$ | | $a_2 = 253.8$ | |

Further correction of residual spherical aberration can be achieved by adding to the system a conical lens as described in our copending application Ser. No. 377,908, now Patent No. 2,821,107.

Correction of the slight chromatic aberration inherent in the system can be achieved by taking suitable dispersion values for the components of the meniscus lens or by adding to the system a color correction plate as described in our copending application Ser. No. 502,803.

*Example 3*

Fig. 5 shows an optical system consisting of the correcting element 13, the plane mirror 14 and the concave spherical mirror 15, in which system a color correction plate 16 has been added. The plane mirror serves to project the image made by the concave mirror on to the film support 17. If this plane mirror were not used the film support would need to be situated approximately at the position of the correcting element. The system is furthermore provided with a diaphragm 18.

[$f$ = 100 mm.; 1:0.9]

| Component | Radius of curvature, mm. | Thickness, mm. | Distance, mm. | $n_D$ | $\nu$ | Grade of glass |
|---|---|---|---|---|---|---|
| VII | $r_9 = \infty$ | $d_7 = 10.0$ | | 1.540 | 59.5 | BaK$_2$ |
| VIII | $r_{k2} = -226.4$ | $d_8 = 6.2$ | | 1.540 | 47.2 | LLF$_2$ |
| | $r_{10} = \infty$ | | $a_3 = 20$ | | | |
| IX | $r_{11} = -82.20$ | $d_9 = 3.3$ | | 1.540 | | |
| X | $r_{k3} = -237.7$ | $d_{10} = 15.7$ | | 1.744 | | |
| | $r_{12} = -108.10$ | | $a_4 = 108.1$ | | | |
| Mirror | $r_{13} = -216.21$ | | | | | |

What we claim is:

1. An optical system comprising a concave spherical mirror and a compound meniscus lens located in front of said mirror and being corrective of the spherical aberration of said mirror, said meniscus lens having spherical outer surfaces at least one of which is nonconcentric with said mirror, said spherical outer surfaces having centers of curvature situated near the center of curvature of said mirror and having minimized refractive power by being divided into two components made of different glasses, one of said components having positive power and its glass having a refractive index not less than 0.05 higher than that of the other of said components which has negative power, the spherical inner facing surfaces of said components being substantially normal to light rays emanating from the point of the object which is situated on the optical axis and so refracting light rays having traversed one outer surface of the meniscus lens perpendicularly that, after refraction, said light rays are substantially normal to the other surface, whereby an image of the center of curvature of one outer surface of the meniscus lens is formed by the internal surface at a position at or near the center of curvature of the other outer surface.

2. Optical system according to claim 1, wherein the distance between the centers of curvature of the outer surfaces of the meniscus lens and the center of curvature of the concave mirror is smaller than one tenth part of the radius of curvature of the mirror.

3. An optical system as set forth in claim 1 wherein the rear outer surface of said meniscus lens and the concave spherical mirror are concentric.

4. An optical system as set forth in claim 1 wherein the glasses of the meniscus lens components have different dispersions in addition to different refractive indices whereby said lens is achromatic.

5. An optical system as claimed in claim 1 wherein a compound correcting plate is located substantially at the center of curvature of the mirror, said plate having plane outer surfaces and a curved inner surface separating glasses of substantially equal mean refractive indices and different dispersions whereby said plate has substantially no refractive power for light of mean wave length and is corrective of the chromatic aberration of said meniscus lens.

References Cited in the file of this patent
UNITED STATES PATENTS

| | | |
|---|---|---|
| 2,350,112 | Houghton | May 30, 1944 |
| 2,448,699 | Bowers | Sept. 7, 1948 |
| 2,509,554 | Wynne | May 30, 1950 |

FOREIGN PATENTS

| | | |
|---|---|---|
| 732,427 | Great Britain | June 22, 1955 |
| 883,937 | France | Apr. 5, 1943 |

OTHER REFERENCES

"An Improved Type of Schmidt Camera," Nature, Hawkins et al., vol. 157, No. 3988, April 1946, pages 445, 446.

"Recent Advances of Astronomical Camera Design," The Photographic Journal (British), Linfoot, vol. 88B, May–June 1948, pages 58–64.

"New Light on the Telescope," The Optician, CXXIV, King, No. 3225, January 9, 1953, pages 645, 646.